(12) United States Patent
Hon

(10) Patent No.: US 6,364,504 B1
(45) Date of Patent: Apr. 2, 2002

(54) HAND-HELD SPOT LIGHT HAVING A BATTERY BY-PASS CIRCUIT

(75) Inventor: Ellis Hon, Sunshine (HK)

(73) Assignee: The Brinkmann Corporation, Dallas, TX (US)

( * ) Notice: Subject to any disclaimer, the term of this patent is extended or adjusted under 35 U.S.C. 154(b) by 0 days.

(21) Appl. No.: 09/454,129

(22) Filed: Dec. 3, 1999

(51) Int. Cl.⁷ .................................................. F21L 4/00
(52) U.S. Cl. ........................ 362/208; 362/190; 362/205; 362/399
(58) Field of Search ................................. 362/183, 190, 362/191, 202, 205, 208, 197, 399, 382

(56) References Cited

U.S. PATENT DOCUMENTS

| | | |
|---|---|---|
| 1,703,749 A | 2/1929 | Rahm |
| 2,338,078 A | 12/1943 | Wood |
| 3,963,886 A | 6/1976 | Yen |
| 3,992,596 A | 11/1976 | Miller |
| 4,025,743 A | 5/1977 | Oswald |
| 4,115,842 A | 9/1978 | Keller |
| 4,171,534 A | 10/1979 | Strowe |
| 4,307,439 A | 12/1981 | Sassmannshausen |
| 4,325,107 A | 4/1982 | MacLeod |
| 4,327,401 A | 4/1982 | Siiberg |
| 4,357,648 A | 11/1982 | Nelson |
| 4,388,673 A | 6/1983 | Maglica |
| 4,460,863 A | 7/1984 | Conforti |
| 4,656,565 A | 4/1987 | Maglica |
| 4,658,336 A | 4/1987 | Maglica |
| 4,797,517 A | 1/1989 | Ohashi |
| 4,843,298 A | 6/1989 | Brauch et al. |
| 4,914,555 A | 4/1990 | Gammache |
| 5,272,606 A * | 12/1993 | Blaney .................. 362/205 |
| 5,283,724 A | 2/1994 | Mulholland |
| 5,359,505 A | 10/1994 | Story et al. |
| 5,418,433 A | 5/1995 | Nilssen |
| 5,671,999 A | 9/1997 | Guthrie et al. |
| 5,847,540 A | 12/1998 | Burns et al. |
| 5,904,414 A | 5/1999 | Monteleone et al. |
| 5,909,952 A | 6/1999 | Guthrie et al. |
| 5,911,497 A * | 6/1999 | Mele ..................... 362/202 |
| 6,056,414 A * | 5/2000 | Krieger .................. 362/190 |

\* cited by examiner

*Primary Examiner*—Y. My Quach-Lee
(74) *Attorney, Agent, or Firm*—Sheppard, Mullin, Richter & Hampton LLP

(57) ABSTRACT

A spotlight powered using either an internal power source such as dry cell batteries or an external power source such as a 12-volt power supply. The spotlight adapted to be held by a person's hand or attached to a hook or tripod for directing a beam of light from the spotlight to a specific location. The spotlight having a battery by-pass circuit that enables the spotlight to operate independent of whether or not batteries are installed in the spotlight. This feature enhances the convenience and reduces the weight of the spotlight so that it may be operated without batteries.

21 Claims, 7 Drawing Sheets

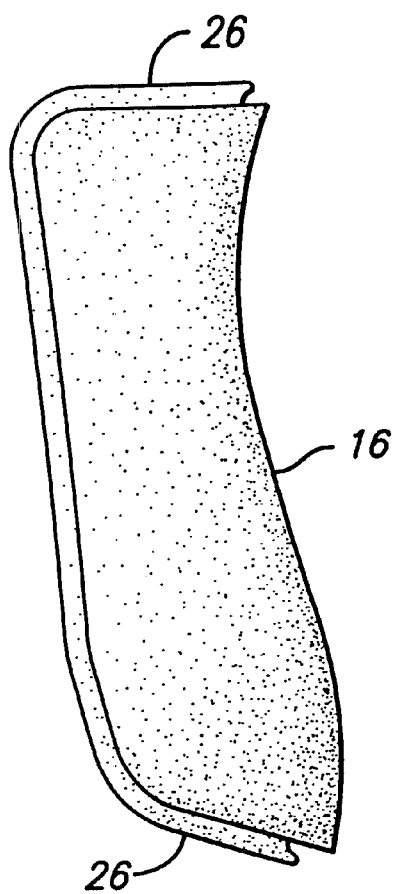
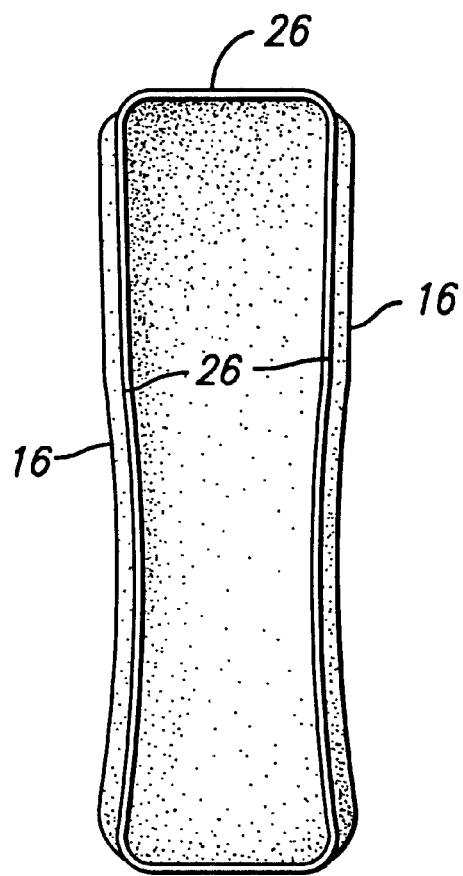
FIG. 2A
FIG. 2B

HAND-HELD SPOT LIGHT HAVING A BATTERY BY-PASS CIRCUIT

BACKGROUND OF THE INVENTION

1. Field of the Invention

The present invention pertains to the field of high power spotlights. More particularly, this invention relates to a portable hand-held high power spotlight having a battery by-pass circuit that enables the spotlight to be powered by an external power source without having the battery in the spotlight.

2. Description of the Related Art

High powered spotlights incorporate a large cylindrical housing having a reflector and a high intensity bulb at one end of the housing. The bulb receives power from an external power supply and generates high intensity light. The housing attaches to a large movable support so the operator can control the movement of the spotlight and direct the high intensity beam of light at a particular object. The lack of portability resulting from large spotlights has caused designers to develop a hand-held high powered spotlight.

One of the primary purposes of hand-held high powered spotlights is portability; therefore, it is important they be lightweight and compact so a user can hold or carry these spotlights. Hand-held high powered spotlights are powered by a battery or an external power supply.

Handheld spotlights powered by an external power supply require rechargeable batteries to be placed in the spotlight in order for the spotlight to operate from the supply. The external power supply provides power to the spotlight while simultaneously recharging the batteries. Even though the batteries are not used to power the spotlight when it is connected to the external power supply, they must be in the spotlight to complete the circuit between the external power supply and the bulb. Because the batteries are required to complete the circuit, the spotlight cannot be operated on external power without the batteries. The batteries, however, add unnecessary weight to the spotlight. Furthermore, in an emergency situation, it may be inconvenient or even impossible to find batteries needed for operation of the spotlight from the external power supply.

It should therefore be appreciated there is a need for a high powered portable spotlight that will operate from an external power source without having batteries installed therein. The present invention fulfills this need.

SUMMARY OF THE INVENTION

The present invention is embodied in a spotlight that is powered using either an internal power source such as dry cell batteries or an external power source such as a 12-volt power supply. The spotlight is adapted to be held by a person's hand or attached to a hook or tripod for directing light from the spotlight to a specific location. The present invention incorporates a battery by-pass circuit that enables the spotlight to operate irrespective of whether or not batteries are installed in the spotlight. The by-pass circuit provides the user with flexibility because the spotlight may be operated when batteries are not installed in the battery compartment.

The spotlight of the present invention includes a reflector having a base at one end and an opening at the other end. The spotlight further includes a housing holding the reflector, a handle, and a cavity with electrical contacts configured to contact a battery. The handle is used to hold the spotlight or attach the spotlight to a tripod so the light projects from the spotlight to a specific location.

The spotlight also includes a battery by-pass circuit so the spotlight can operate irrespective of whether or not batteries are installed in the housing. The battery by-pass circuit is located substantially within the housing of the spotlight. The by-pass circuit includes a plurality of conductors, a switch, and a socket.

A plate, having a bulb socket interposed between first conductors, is positioned within the cavity such that the bulb socket is positioned at the base of the reflector. A bulb of at least 80 lumens is positioned in the bulb socket for producing light directed by the reflector beyond its opening. The reflector reflects light from the bulb through a plastic lens that is located at the opening of the reflector. A second conductor electrically connects the electrical contacts for the battery to the switch and the bulb socket. A third conductor connects the first conductor to the socket, with the switch therebetween. The resulting electrical circuit is independent of the second conductor. The by-pass circuit provides a connection between a socket and the bulb socket. The socket is recessed within the housing and is configured to receive a plug from an external power source to provide power to the bulb. The switch, controlled by a trigger button, is interposed between the socket and the bulb socket. The switch is positioned within the housing for activating the bulb. The trigger button is located adjacent to the handle.

A cord is used to power the spotlight using an external power source. The cord includes the plug at one end and to a lighter plug at the other end. The lighter plug typically receives an input voltage of 12-volts from a lighter receptacle and includes a power conversion circuit that converts the input voltage to an output voltage of approximately 6 volts. The plug is connected to the socket and transfers the output voltage from the cord to the spotlight.

Advantages of the invention include providing a spotlight that can operate using either batteries or an external power supply without having batteries installed within the spotlight. Furthermore, the present invention provides a lightweight and compact spotlight.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 2A is a side view of the rubber or elastomeric material used to cover the rear portion of the handle;

FIG. 2B is a rear inside view of the rubber material of FIG. 2A;

DESCRIPTION OF THE PREFERRED EMBODIMENT

Figure 1:
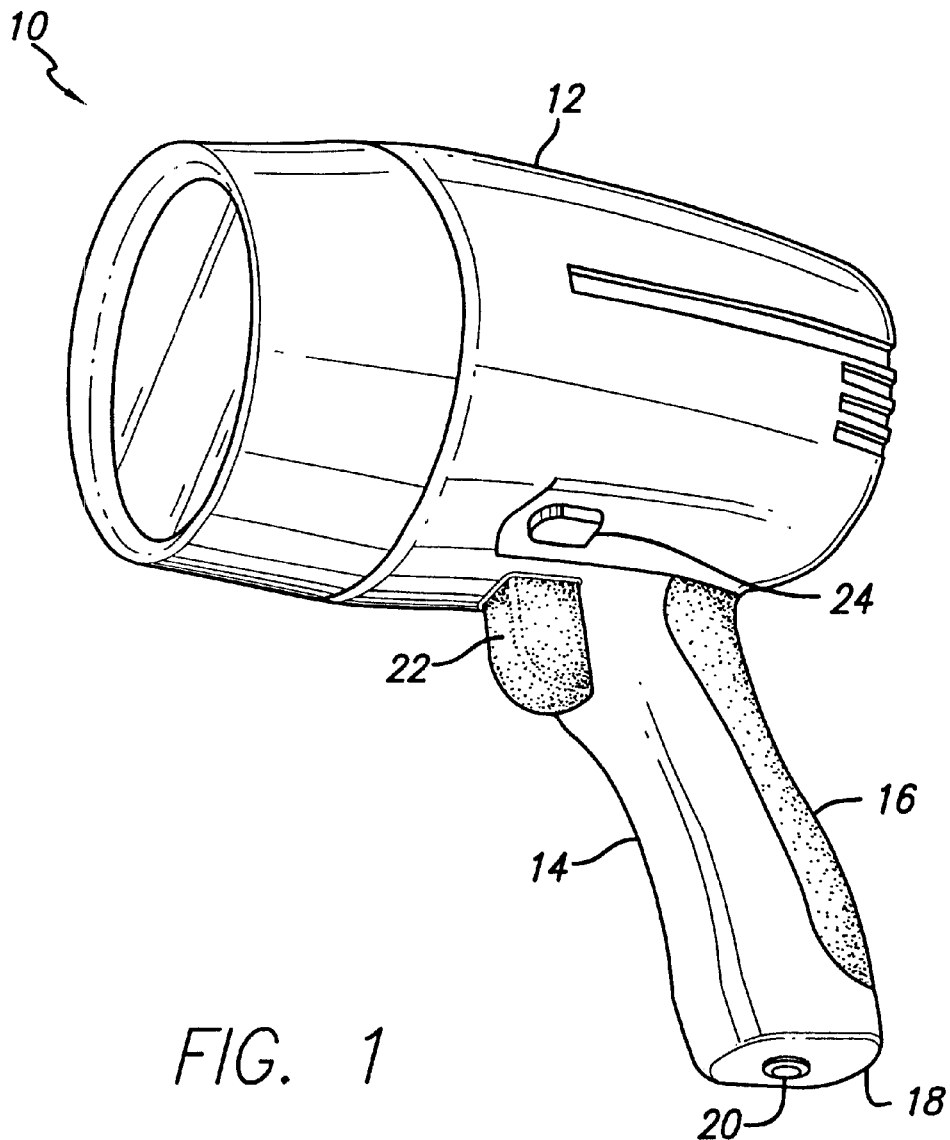
FIG. 1 is a perspective view of a hand-held spotlight according to the present invention.

With reference now to the illustrative drawings, and particularly to FIG. 1, there is shown a perspective view of a hand-held spotlight 10 according to the present invention. The spotlight of the present invention can be used while hiking, mountain climbing, driving or repairing an automobile, or in an emergency situation. The spotlight includes a housing 12 and a handle 14. The housing and handle are integrally formed and are made from a durable plastic material. The handle of the spotlight protrudes from the bottom rear portion of the housing and is adapted to be held by a person's hand for directing light from the spotlight to a specific location. The housing is typically cylindrical in shape. Alternative, the housing can be square or elliptical in shape. A rear portion 16 of the handle is typically covered using a rubber or elastomeric material to provide a better grip with the person's hand. In addition, a bottom portion 18 of the handle has a threaded tripod socket 20 to accept a tripod mounting screw (not shown). Attaching the spotlight to a tripod allows hands-free operation of the spotlight for accurately directing the light generated by the spotlight to a specific location. Furthermore, attaching the spotlight to a tripod minimizes the amount of jitter or shaking produced when a person is holding the handle of the spotlight.

A trigger button 22 is positioned adjacent to and partially recessed within the handle 14 and is coupled to a switch (see FIGS. 8A and 8B) located within the cavity that activates the bulb. Depressing the trigger button turns the bulb on and releasing the trigger button turns the bulb off. When the trigger button is in the on or off position it can be locked in place using a trigger lock 24.

FIG. 2A is a side view of the rubber or elastomeric material used to cover the rear portion 16 of the handle 14. FIG. 2B is a rear inside view of the rubber material. A rubber lip 26 is formed inside the rubber material and provides the means to attach the rubber material to the handle 14. The rubber lip is positioned along the entire edge of the rubber material and is secured to a plastic lip (not shown) of the handle 14.

Figure 3A:
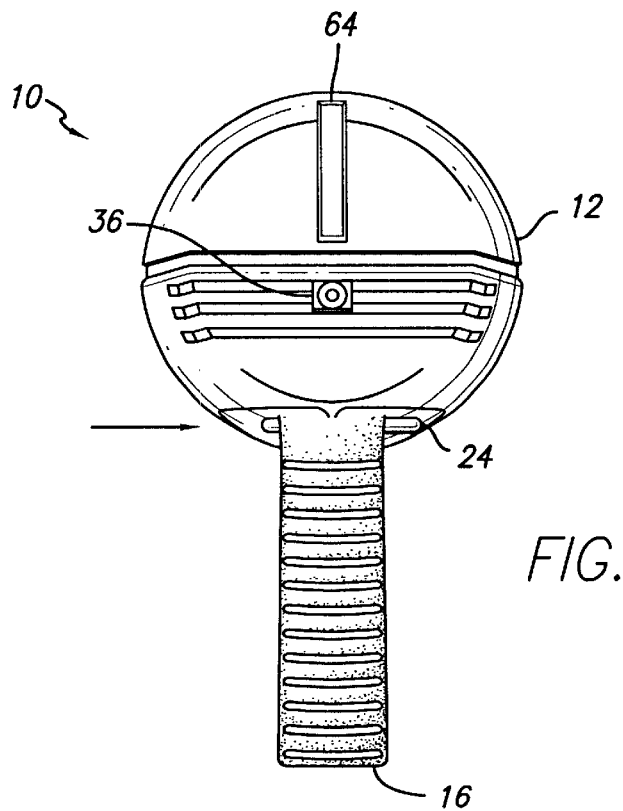
FIG. 3A is a rear view of the spotlight showing the trigger lock in its locked or rightmost position.
Figure 3B:
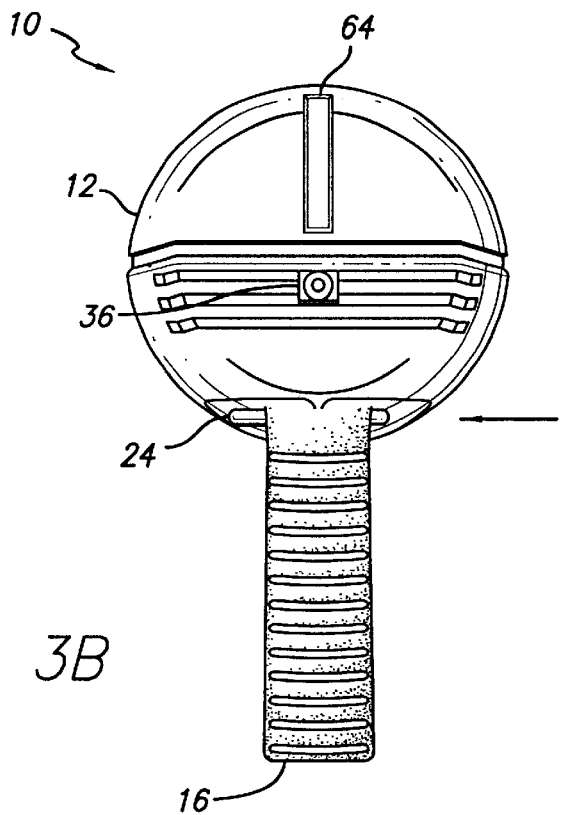
FIG. 3B is a rear view of the spotlight showing the trigger lock in its unlocked or leftmost position.

FIG. 3A is a rear view of the spotlight 10 showing the trigger lock 24 in its locked or rightmost position. FIG. 3B is a rear view of the spotlight showing the trigger lock in its unlocked or leftmost position. When the trigger button 22 (see FIG. 1) is in the on position, the trigger button can be locked in place by moving the trigger lock to its rightmost position. To unlock the trigger button, the trigger lock is moved to its leftmost position. When the trigger button is in the off position, it can be locked in place by moving the trigger lock to its rightmost position. The trigger lock allows the spotlight to remain in the on position without having to continuously press the trigger button. Further, the trigger lock provides a safety mechanism which avoids the spotlight from turning on inadvertently. For example, if the spotlight is placed face down and turns on accidentally, it could burn or ignite surfaces that it comes into contact with such as seats, carpeting, or furniture.

Figure 4:
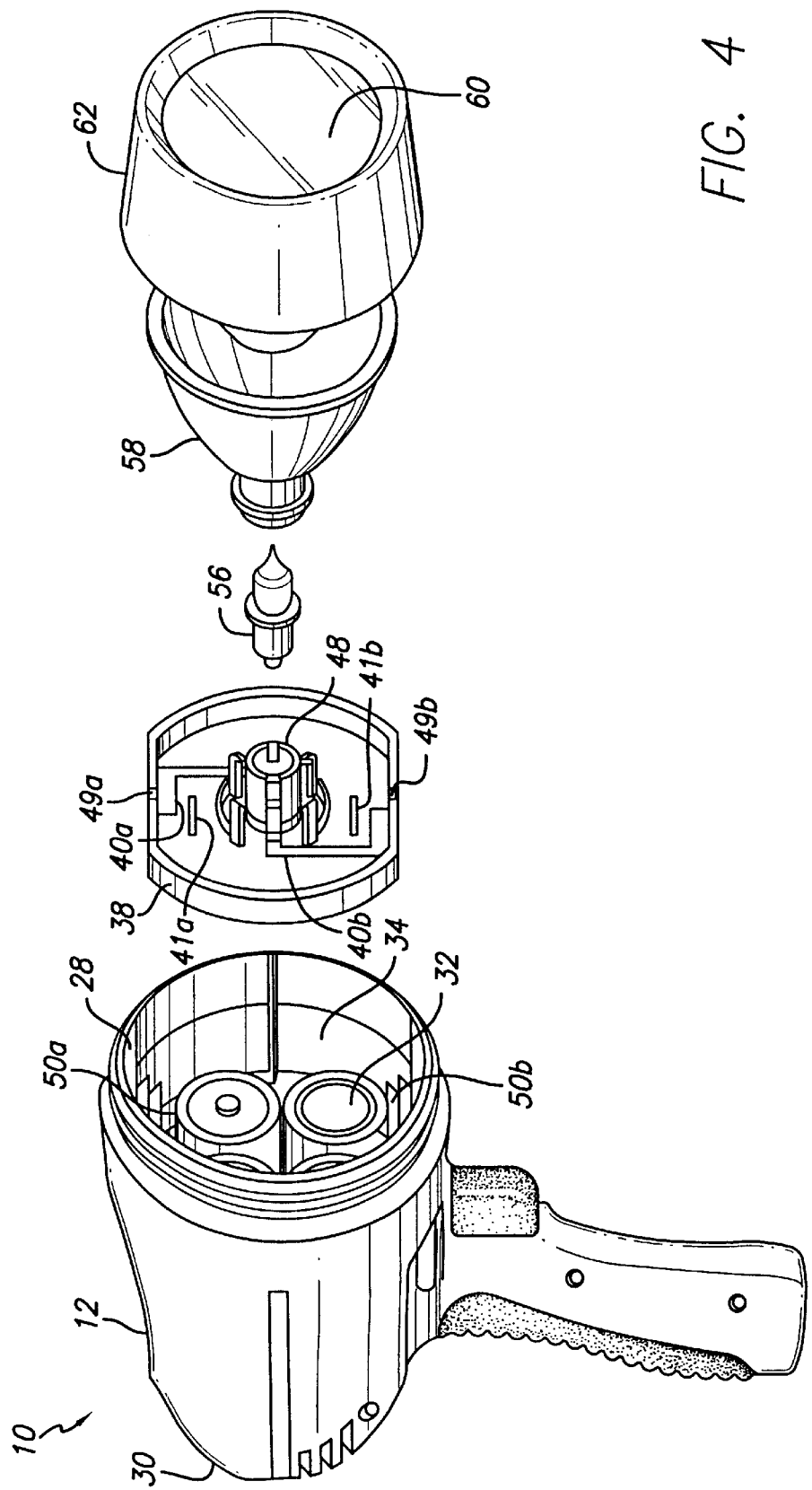
FIG. 4 is a partially exploded view of the spotlight.

FIG. 4 is a partially exploded view of the spotlight 10. The housing 12 has an open front end 28 and a closed back end 30. Batteries 32 are generally positioned inside a cavity 34 of the housing via the open front end. Typically, four D size alkaline batteries are used for providing power to the spotlight. Alternatively, the spotlight 10 can be powered using an external power supply (not shown). The external power source is typically connected to a socket 36 (see FIGS. 3A and 3B) via a cord (see FIG. 6). The socket is shown recessed within the housing 12. The external power source (not shown) is connected to the socket to provide power to the bulb for operating the spotlight. When using the external power source, the batteries do not have to be positioned inside the cavity for the spotlight to operate.

A top plate 38 having first conductors 40*a*, 40*b* and battery contacts 41*a*, 41*b* is positioned above the batteries 32 inside the cavity 34. The battery contacts connect the batteries to one another. A bottom plate 44 (see FIGS. 8A and 8B) having bottom plate contacts 46*a*, 46*b* (see FIGS. 8A and 8B) is generally positioned at the bottom of the cavity for providing an electrical connection to the batteries 32. The first conductors 40*a*, 40*b* and a bulb socket 48 provide an electrical connection between top plate contact 49*a* and top plate contact 49*b*. Housing contacts 50*a*, 50*b* connect to top plate contacts 49*a*, 49*b*, respectively, when the top plate 38 is positioned inside the cavity 34. Second conductors 42*a*, 42*b* connect the bottom plate contacts 46*a*, 46*b* to the first conductors (see FIG. 8B). Also, the second conductors may be connected to the switch. A third conductor 52 (see FIGS. 8A and 8B) connects the socket 36 to the first conductors. The third conductor is typically located inside the cavity 34 of the housing 12.

The batteries 32 provide an electrical connection between the battery contacts 41*a*, 41*b* and the bottom plate contacts 46*a*, 46*b*. Typically, a bulb 56 is inserted into the bulb socket 48 which is positioned in the center of the top plate 38. Current flows across the first and second conductors when the batteries are providing power to the bulb and current flows across the first and third conductors when the external power source is providing power to the bulb. In one embodiment, the bulb has at least 80 lumens. In another embodiment, the bulb has approximately 85 lumens. In yet another embodiment, the bulb has between 80 to 100 lumens. The conductor 42*a* of second conductors is connected to conductor 40*a* of first conductors (see FIGS. 8A and 8B). The conductor 42*b* of second conductors is connected to conductor 40*b* of first conductors through the contact point 72 inside socket 36 and the switch 54 (see FIGS. 8A and 8B). Hence, the spotlight can be operated from the external power supply without having any batteries located in the cavity of the spotlight.

The spotlight 10 further includes a reflector 58 having a base at one end and an opening at the other end. The bulb 56 is positioned through a hole in the base of the reflector for producing a light beam that is directed beyond the opening of the reflector. The reflector reflects light from the bulb through a plastic lens 60 that is located at the opening of the reflector. The plastic lens is supported by a head assembly 62 which fits over the reflector. The open front end 28 of the housing 12 has external threads to fit together with internal threads of the head assembly. When the reflector is facing the user, the head assembly is generally rotated clockwise for securement to the housing.

Figure 5:
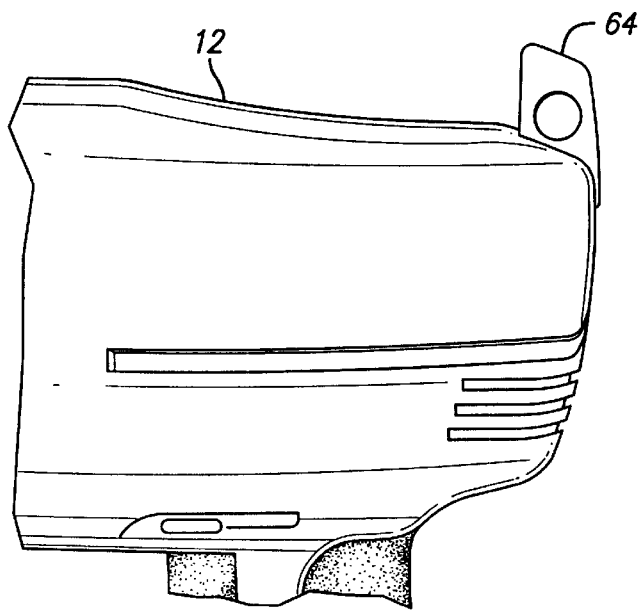
FIG. 5 is a partial side view of the spotlight showing a retractable ring attached to the spotlight housing.

FIG. 5 is a partial side view of the spotlight showing a retractable ring 64 attached to the spotlight housing 12. The retractable ring is shown in its extended position but may be retracted by pushing the hanging ring into the housing so the ring is flush with the housing. The retractable ring is preferably secured to a hook and allows the spotlight to hang while in use or during storage. Hanging the spotlight while in use, allows the operator to be relieved from holding or carrying the spotlight. Thus, both of the user's hand may be free to perform other operations.

Figure 6:
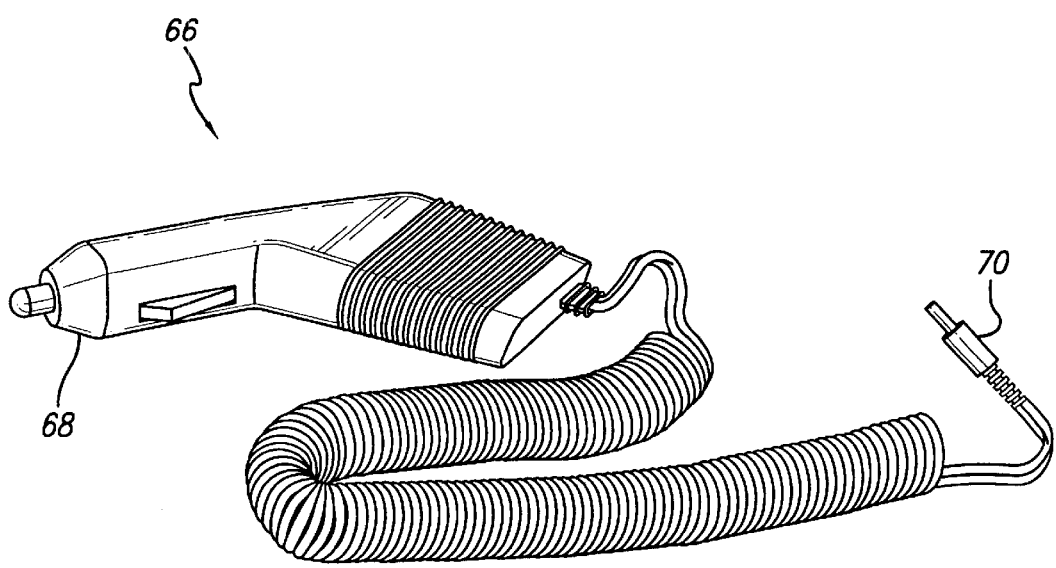
FIG. 6 is a perspective view of the external power source cord.
Figure 7:
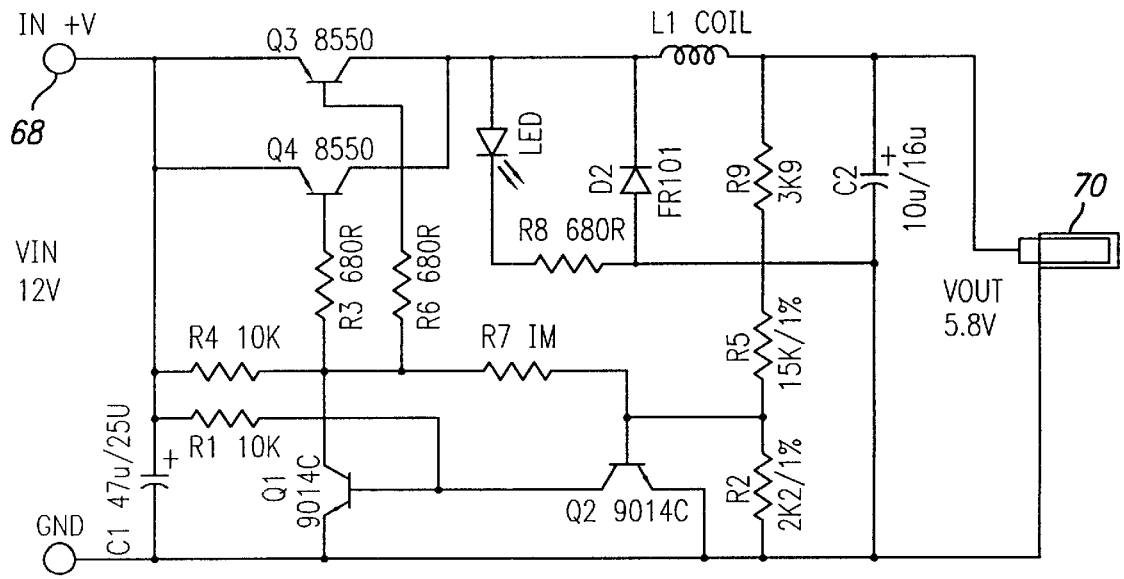
FIG. 7 is a schematic diagram of the power conversion circuit in the cord of FIG. 6.

FIG. 6 is a perspective view of the external power source cord 66. The cord includes a lighter adapter 68 and a plug 70. The lighter adapter is inserted into a 12-volt lighter receptacle such as a 12-volt cigarette lighter receptacle in an automobile. The lighter adapter includes a power conversion circuit (shown in FIG. 7) that converts the 12 volts received from the lighter receptacle to approximately 5.8 volts for use by the spotlight 10. The voltage from the conversion circuit is thereafter transferred to the spotlight via the plug 70 and socket 36 connection. Alternatively, the spotlight can be powered using an A.C. adaptor having an input of 110 volts and an output of 6 volts, a handheld or stationary battery pack, an automobile battery, or any other method of powering the spotlight. One of ordinary skill in the art will be able to modify the conversion circuit for use with different power sources such as the 110-volt A.C. adaptor or a 6-volt battery pack. For example, one of ordinary skill in the art will be able to design a circuit that converts an input voltage of 110 volts to an output voltage of approximately 6 volts. FIG. 7 is a schematic diagram of the power conversion circuit in the cord of FIG. 6. The power conversion circuit is used to convert an input voltage to an output voltage. In one embodiment, a 12-volt input voltage is supplied to the lighter adapter 68 and the conversion circuit converts the input voltage to an output voltage of approximately 5.8 volts at plug 70. The conversion circuit includes a combination of resistors, capacitors, inductors, diodes, and transistors. One of ordinary skill in the art will be able to design the conversion circuit to convert other input voltages to output voltages. For example, an A.C. adapter or transformer can be used to perform this function.

Figure 8A:
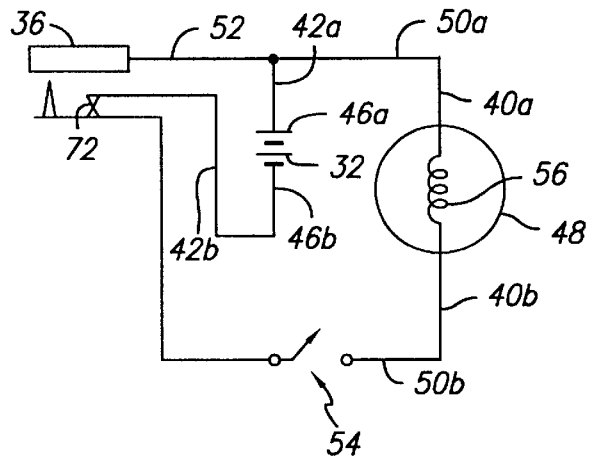
FIG. 8A is a schematic diagram of the circuit in the spotlight.

FIG. 8A is a schematic diagram of the circuit in the spotlight 10. Plug 70 of the cord is typically connected to socket 36 of the spotlight 10. Socket 36 is typically connected to bulb socket 48 via first conductors 40a, 40b and the third conductor 52. The socket is also connected to the switch via a contact point 72. Second conductors 42a, 42b connect the batteries 32 to the bulb socket.

Switch 54 is controlled by trigger button 22. When trigger button 22 is in the on position, switch 54 is closed. When trigger button 22 is in the off position, switch 54 is open.

Figure 8B:
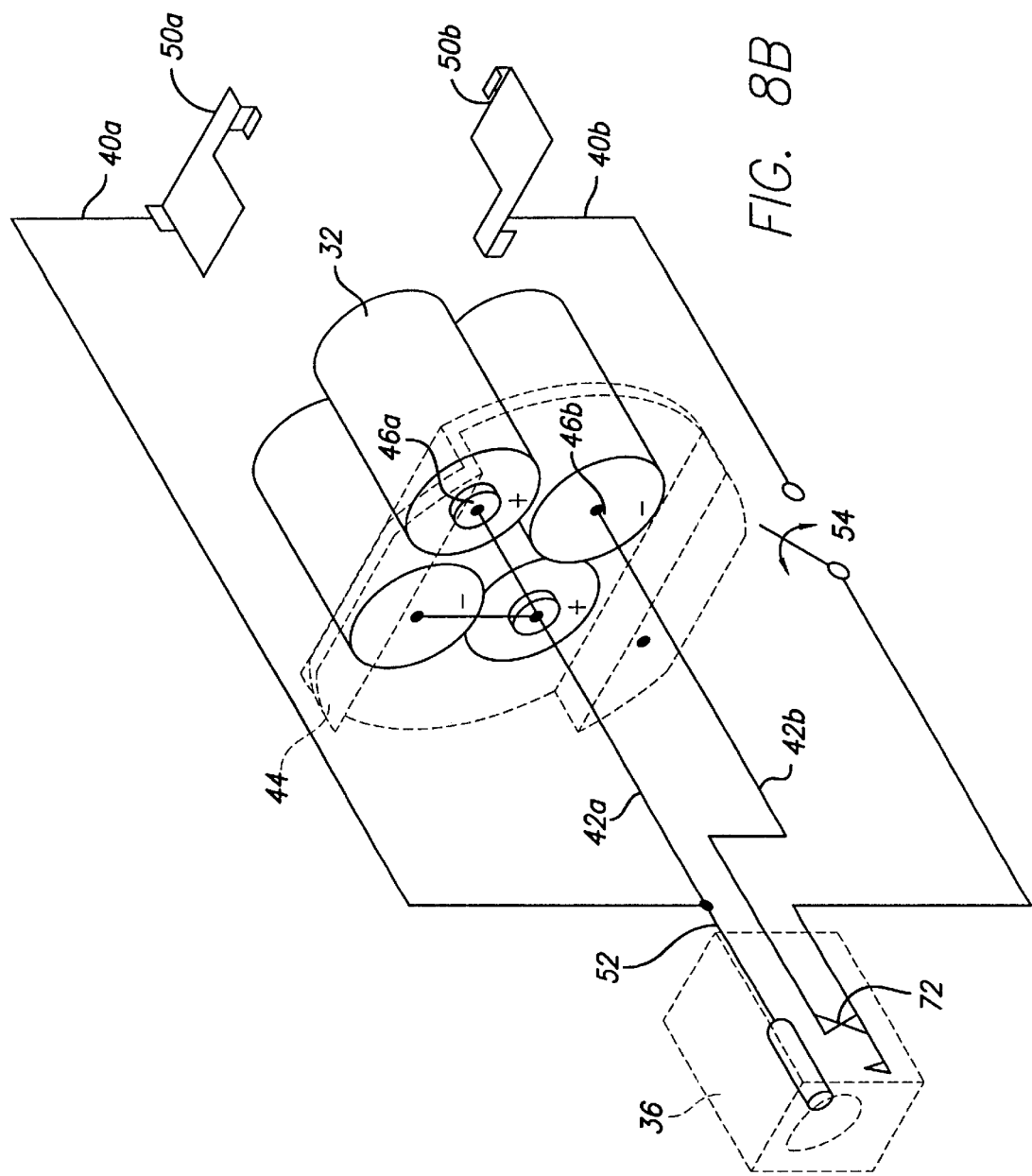
FIG. 8B shows a perspective view of batteries connected with socket and switch in the spotlight.

FIG. 8B shows a perspective view of batteries 32 connected with socket 36 and switch 54 in spotlight 10. The first conductors 40a, 40b, contacts 50a, 50b, and top plate contacts 49a, 49b connect the batteries 32 and the socket 36 to the bulb socket 48 in the top plate 38. The bottom plate contacts 46a, 46b provide a connection to the batteries 32 and are connected to the second conductors 42a, 42b. A contact point 72 connects the second conductors 42a, 42b to the socket 36 and the switch. Hence, when plug 70 of the external power source cord 66 is inserted into the socket 36, the connection of batteries 32 to bulb socket is switched to the connection of socket to bulb socket because the contact point of the socket is opened. Alternatively, when plug 70 is not inserted into the socket, the contact point maintains the connection between the second conductor 42b and the switch 54. These connections allow the spotlight 10 to operate irrespective of whether or not the batteries are installed in the spotlight. The second conductors are also connected to the first conductors. The third conductor 52 connects the socket to the first conductors.

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. A spotlight adapted to be held by a person's hand or attached to a hook or tripod for directing light from the spotlight to a specific location, the spotlight comprising:
   a reflector having a base at one end and an opening at the other end;
   a housing holding the reflector and having a cavity with at least one bottom plate contact configured to contact a battery;
   a handle protruding from the housing;
   a plate having a bulb socket interposed between first conductors, the plate positioned within the cavity such that the bulb socket is positioned at the base of the reflector;
   a bulb of at least 80 lumens, positioned in the bulb socket for producing light directed by the reflector beyond its opening;
   a switch positioned within the cavity, for activating the bulb;
   a socket recessed within the housing, the socket configured to receive a plug from an external power source to provide power to the bulb;
   a second conductor electrically connecting the at least one bottom plate contact for the battery to at least one of the first conductors; and
   a third conductor configured to connect the socket to at least one of the first conductors, the socket configured to connect to the switch, wherein the third conductor is configured to carry an electrical current from the socket to at least one of the first conductors without the electrical current traveling along the second conductor.

2. A spotlight as defined in claim 1, wherein the battery provides power to the bulb.

3. A spotlight as defined in claim 1, further comprising a trigger button in operative relation with the switch and a trigger lock having an on position to lock the trigger button in either a first position or a second position and an off position to allow the trigger button to move from the first position to the second position.

4. A spotlight as defined in claim 1, wherein the bulb has less than 100 lumens.

5. A spotlight as defined in claim 1, further comprising a trigger button partially recessed within the handle.

6. A spotlight as defined in claim 1, further comprising a retractable ring mounted within the housing.

7. A spotlight as defined in claim 1, wherein the handle has a threaded socket to accept a tripod mounting screw.

8. A spotlight as defined in claim 1, wherein the switch is coupled to a trigger button.

9. A spotlight as defined in claim 1, wherein the external power source is a 12-volt D.C. power supply.

10. A spotlight as defined in claim 1, wherein the handle has a rear portion covered with a rubber material.

11. A spotlight for directing a beam of light to a specific location, the spotlight comprising:
    a housing having a cavity configured to receive at least one battery;
    a handle adapted to be held by a person's hand and protruding from the housing;
    a bulb socket positioned within the cavity;
    a bulb having at least 80 lumens and positioned in the bulb socket;
    a reflector having a base at one end and a mouth at the other end, the bulb being positioned at the base of the reflector for producing a light beam that is directed beyond the mouth of the reflector;

a trigger button positioned adjacent to the housing, and having an on and off position for turning the bulb on and off;

a trigger lock for locking the trigger button in the on or off position;

a socket recessed within the housing for receiving power from an external power source;

a first conductor connected to the bulb socket;

a second conductor configured to connect the at least one battery to the first conductor;

a third conductor configured to connect the socket to the first conductor; and a switch controlled by the trigger button, and positioned in-line with the first conductor.

12. A spotlight as defined in claim 11, wherein current flows across the second conductor when the battery is providing power to the bulb and current flows across the third conductor when the external power source is providing power to the bulb.

13. A spotlight as defined in claim 11, wherein the at least one battery provides power to the bulb.

14. A spotlight as defined in claim 11, wherein at least one of the first conductors connects the second conductor to the bulb socket.

15. A spotlight as defined in claim 11, wherein the third conductor is configured to carry an electrical current to the first conductor without the electrical current traveling across the at least one battery and the second conductor.

16. A spotlight as defined in claim 11, wherein the handle has a tripod socket.

17. A spotlight as defined in claim 11, wherein the switch is configured to connect the battery to the bulb socket.

18. A spotlight as defined in claim 11, further comprising a rubber material secured to a rear portion of the handle.

19. A spotlight as defined in claim 18, wherein the rubber material has a lip that is used to secure the rubber material to the handle.

20. A spotlight for directing a beam of light to a specific location, the spotlight comprising:

a housing having a cavity configured to receive at least one battery;

a handle having a tripod socket and adapted to be held by a person's hand and protruding from the housing;

a bulb socket positioned within the cavity;

a bulb having at least 80 lumens and positioned in the bulb socket;

a reflector having a base at one end and a mouth at the other end, the bulb being positioned at the base of the reflector for producing a light beam that is directed beyond the mouth of the reflector;

a trigger button positioned adjacent to the housing, and having an on and off position for turning the bulb on and off;

a trigger lock for locking the trigger button in the on or off position;

a socket recessed within the housing for receiving power from an external power source;

a first conductor connected to the bulb socket; and a switch controlled by the trigger button, and positioned in-line with the first conductor.

21. A spotlight for directing a beam of light to a specific location, the spotlight comprising:

a housing having a cavity configured to receive at least one battery;

a handle adapted to be held by a person's hand and protruding from the housing;

a bulb socket positioned within the cavity;

a bulb having at least 80 lumens and positioned in the bulb socket;

a reflector having a base at one end and a mouth at the other end, the bulb being positioned at the base of the reflector for producing a light beam that is directed beyond the mouth of the reflector;

a trigger button positioned adjacent to the housing, and having an on and off position for turning the bulb on and off;

a trigger lock for locking the trigger button in the on or off position;

a socket recessed within the housing for receiving power from an external power source;

a first conductor connected to the bulb socket;

a switch controlled by the trigger button, and positioned in-line with the first conductor; and a rubber material secured to a rear portion of the handle, the rubber material having a lip that is used to secure the rubber material to the handle.

\* \* \* \* \*